March 28, 1944.    K. JANSEN    2,345,050
CUTTER HEAD FOR MILLING MACHINES
Filed Aug. 20, 1941

INVENTOR
KARL JANSEN
BY
Karl A. Mayr
ATTORNEY

Patented Mar. 28, 1944

2,345,050

UNITED STATES PATENT OFFICE 2,345,050

CUTTERHEAD FOR MILLING MACHINES

Karl Jansen, Mannheim, Germany; vested in the Alien Property Custodian

Application August 20, 1941, Serial No. 407,518
In Germany December 23, 1939

4 Claims. (Cl. 29—105)

The present invention relates to a cutter head for milling machines, said head being provided at the circumference thereof with a plurality of cutters for milling plane surfaces, for example the surfaces of machine casings.

Hitherto surfaces of the type described were worked with a planing machine in a preliminary planing off operation and a following planishing operation. Milling machines were also used having cutter heads with a plurality of cutters disposed on the circumference thereof. Smooth surfaces with the required tolerance can only be produced in this manner if the cutting edges of the cutters move without any shocks. Even minute shocks or vibrations cause corresponding uneven portions of the surface. It is very difficult to assure shock- or vibration-free operation particularly of larger cutter heads. A basic condition for vibration-free operation is utmost care in grinding the cutters. In actual practice vibration free milling can very seldom be found. Advance of the cutter must be held within very small limits and the cutters must be operated at very high speeds so that the surfaces milled at different revolutions of the cutter head are superimposed. Such small advances do not meet present day requirements as to operating speed and size of machines.

Combinations of milling and planing machines have been proposed whereby preliminary planing off is accomplished by the cutter head of the milling machine during movement of the work piece in one direction and planishing is carried out while the work piece moves in the opposite direction. This method is composed of two operating steps and is therefore complicated and it also includes the undesired planing operation. Milling machines having a plurality of spindles and cutter heads operating in series have been proposed whereby the planing off operation is done at slow speed, with small diameter cutter heads and planishing by larger diameter, high speed cutter heads. Such machines are also complicated and expensive.

It is an object of the present invention to provide a cutter head for a milling machine which avoids all the disadvantages set forth above. In the cutter head according to the present invention the cutting edge of one or of a plurality of the cutters disposed on the same cutter head for each surface portion to be worked is broader than that of the other cutters and protrudes in axial direction slightly further than the cutting edges of the other cutters. The broader cutter or cutters act as planing off cutters. The broader cutting edges are preferably of such size and in such position that the planed off surfaces overlap after each revolution of the cutter head. It is important that the cutting edge of only one or of a plurality of the cutters is broader than that of other cutters. If the edges of all cutters would be made broader, rattling of the cutter head and the milling machine would be unavoidable at the high pressures at which the milling operation takes place. A milling machine provided with cutter heads according to the present invention has only one cutter head for each surface to be milled and may be operated at the same advances which can be used in conventional milling machines only if a plurality of cutter heads are provided for each surface portion to be milled or if an additional planing machine is provided. With the machine according to the present invention the desired surface quality can be produced in one operating step. Of course increased smoothness of the surface may be obtained by milling the surface twice. In the latter case much larger advances such as 12 inches per minute and more may be employed.

Further and other objects of the present invention will be hereinafter set forth in the accompanying specification and claims and shown in the drawing which, by way of illustration, show what I now consider to be preferred embodiments of my invention.

In the drawing.

Like parts are designated with like numerals in both figures of the drawing.

Figure 1:
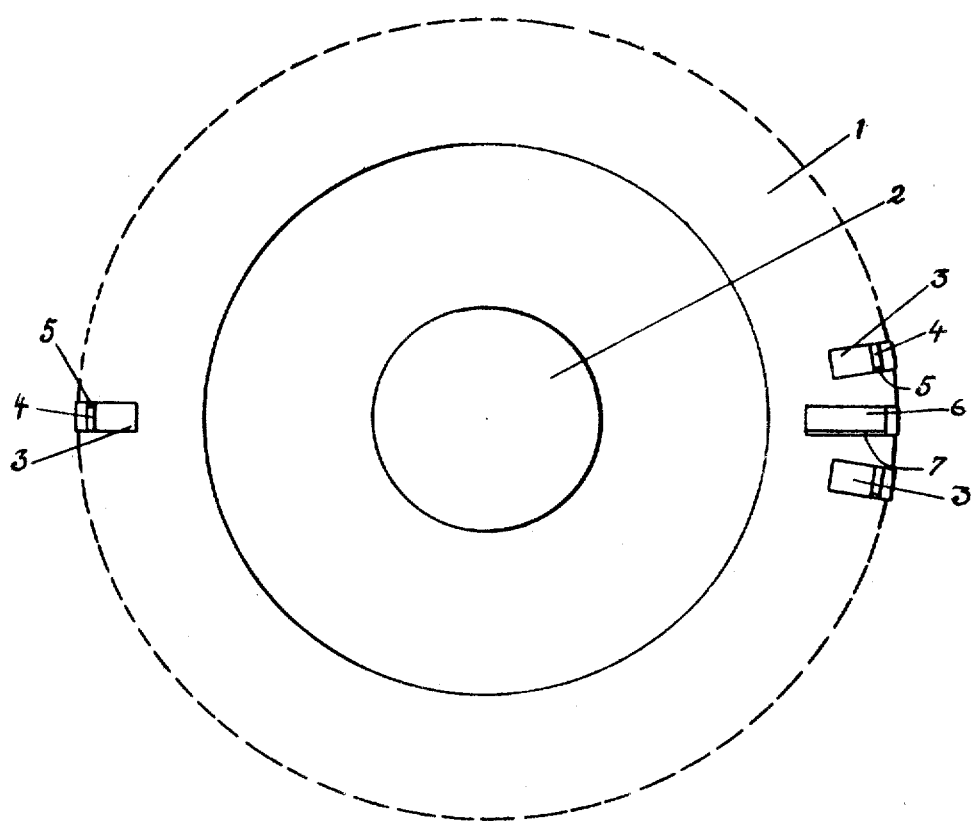
Figure 1 is a bottom view of a cutter head according to the invention.
Figure 2:
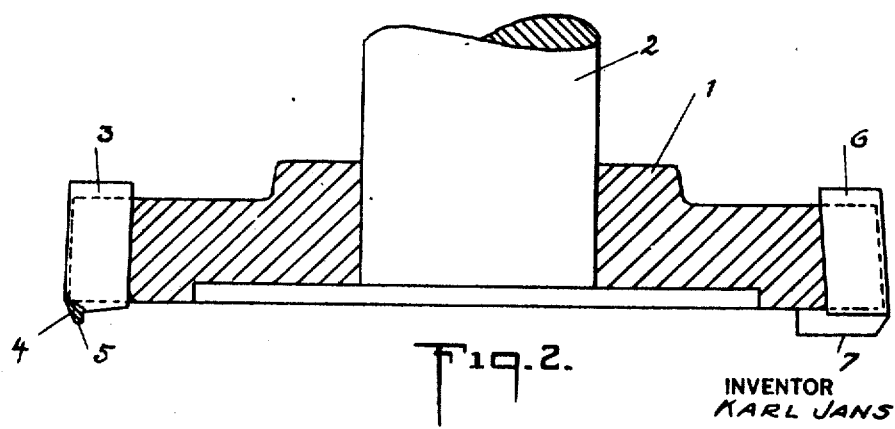
Figure 2 is an axial sectional view of a cutter head according to the invention.

Referring more particularly to the drawing, the cutter head 1 is carried by the rotating spindle 2. Head 1 is provided with recesses or notches at its circumference into which the cutters 3 and 6 of which only some are shown in the drawing are inserted. The cutters 3 are provided with cutting plates 4 made in conventional manner of high quality cutting steel which form small cutting edges 5. One or more cutters 6 are provided with a cutting edge 7 which is broader than that of the cutters 3 and which slightly protrudes in axial direction beyond that of the cutters 3.

While I believe the above described embodiments of my invention to be preferred embodiments, I wish it to be understood that I do not desire to be limited to the exact details of design and construction shown and described, for obvious modifications will occur to a person skilled in the art.

What is claimed is:

1. A cutter head for a milling machine having a number of cutters, a plurality of said cutters having cutting edges disposed in a plane and at substantially equal distance from the axis of rotation of said cutter head, one of said cutters having a cutting edge broader than the cutting edges of the other cutters and protruding slightly beyond the plane in which said other cutters are located.

2. A cutter head for a milling machine comprising a set of cutters having relatively small cutting edges disposed in one plane, and a set of other cutters interspersed between said first mentioned cutters and having cutting edges broader than the cutting edges of said first mentioned cutters and protruding slightly beyond the plane in which said first mentioned cutters are disposed.

3. A cutter head for milling machines as set forth in claim 2, in which said other cutters are positioned at substantially equal distance from the axis of rotation of said cutter head.

4. A cutter head for milling machines as set forth in claim 2, in which the outer ends of all cutting edges are disposed at substantially equal distances from the axis of rotation of said cutter head.

KARL JANSEN.